Aug. 31, 1965   H. HUPFER   3,203,989
PROCESS FOR THE PRODUCTION OF PHENYLHYDRAZINE HYDROCHLORIDE
Filed Aug. 14, 1962
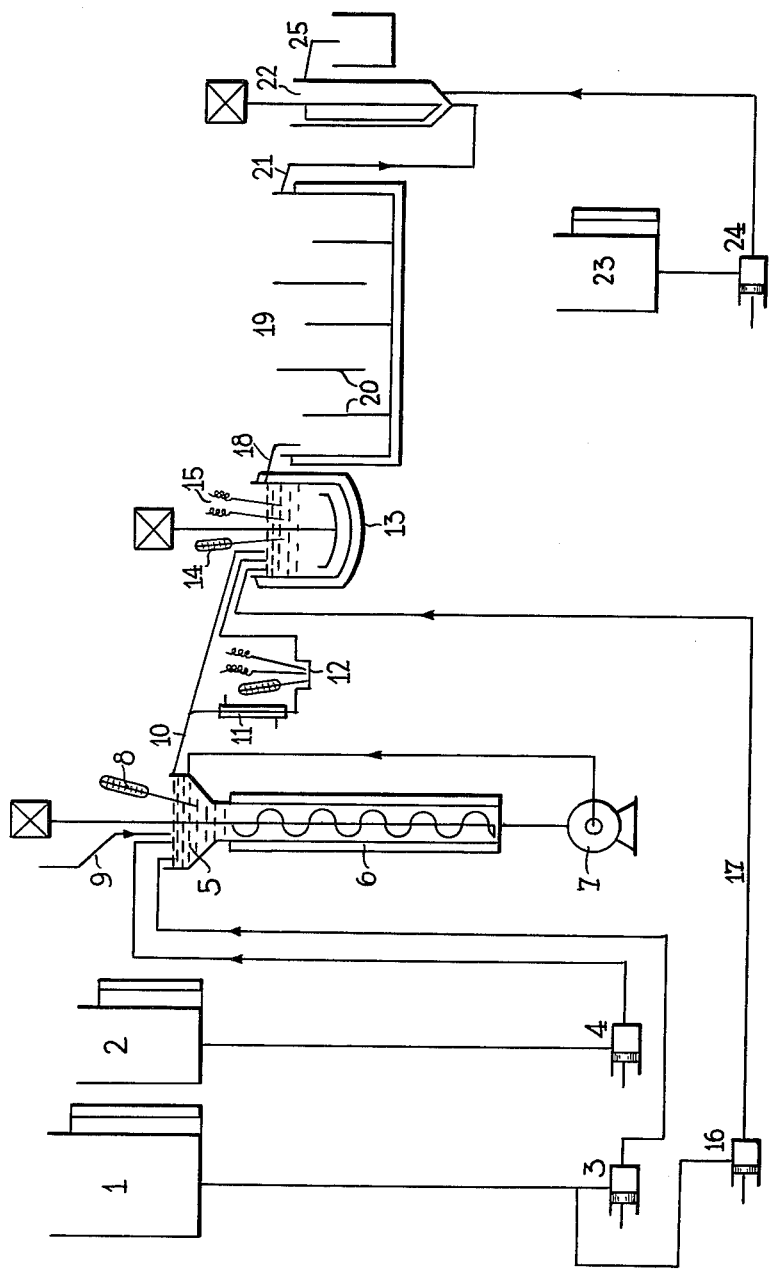
INVENTOR
HEINZ HUPFER
BY
*Curtis, Morris & Safford*
ATTORNEYS 3,203,989
PROCESS FOR THE PRODUCTION OF PHENYL-HYDRAZINE HYDROCHLORIDE
Heinz Hupfer, Frankfurt am Main, Germany, assignor to Farbwerke Hoechst Aktiengesellschaft vormals Meister Lucius & Brüning, Frankfurt am Main, Germany, a corporation of Germany
Filed Aug. 14, 1962, Ser. No. 216,880
Claims priority, application Germany, Aug. 17, 1961, F 34,710
7 Claims. (Cl. 260—569)

The present invention relates to a process for the production of phenylhydrazine hydrochloride.

It is known to prepare phenylhydrazine hydrochloride by reducing phenyldiazonium chloride with the aid of sodium bisulfite by adding a solution of phenyldiazonium chloride within 30 minutes, while stirring, to a highly concentrated aqueous mixture of sodium bisulfite and sodium sulfite which has been cooled to 20 to 30° C., the reaction mixture warming up to about 40° C. The mixture is then heated to 85° C. for example by means of direct steam. In order to complete the reduction to obtain the sodium salt of phenylhydrazine disulfonic acid and to eliminate staining by-products, the reaction mixture is mixed with acetic acid and zinc dust. The light yellowish solution is then removed from the sediment by filtration and the filtrate is mixed with concentrated hydrochloric acid whereby the phenylhydrazine hydrochloride precipitates.

Now I have found that the formation of by-products can be prevented to such an extent that the aftertreatment with zinc dust and acetic acid can be dispensed with when the diazo solution is rapidly and intimately mixed with the sulfite/bisulfite mixture which has been brought into a fine state of subdivision and the temperature is maintained within the range of 0 and 30° C. and, furthermore, when the amount of sodium sulfite or of the alkaline component forming sodium sulfite or the amount of sodium bisulfite solution is adjusted in a manner such that the reduction mixture heated to 80–85° C. has a pH of 5.0–7.0, preferably 5.5–5.8.

After being heated, the reduction mixture is advantageously maintained for at least 15 to 120 minutes, preferably 60 to 90 minutes, at a temperature ranging between 80 and 85° C. The reaction may be carried out in a continuous manner.

Such a solution practically brightens to take the same color as a reaction mixture aftertreated with zinc dust. This solution needs no filtration and, when being reacted with hydrochloric acid, it gives the same results regarding quality and yield as the mixture aftertreated with zinc dust. In particular it does not contain any impurities distrubing the subsequent treatment of the hydrochloride to form free phenylhydrazine and its distillation.

I have also found that the mixture of sodium bisulfite and sodium sulfite necessary for the reduction can be prepared without any risk of decompositions and side reactions in the immediate presence of the diazo compound, for instance by introducing simultaneously and continuously into a reaction vessel provided with a cooler a diazo solution, a sodium hydroxide solution and a sodium bisulfite solution in an appropriate proportion. The sodium sulfite formed which is difficulty soluble in water and has a tendency to form hard coarse crystals is consumed for the greater part in the nascent state by the reaction with the phenyldiazonium chloride so that it cannot cause clogging and formation of crystal coverings on the cooling surfaces which retard the heat transfer. Furthermore, it need not be comminuted.

Furthermore, I have found that without endagering the result of the present process the amount of bisulfite introduced into the first reduction step can be diminished to 75% of the total amount required, the remaining amount being introduced later on. This means that less hydrogen ions are introduced into the first reduction step in which there is a particularly high risk of disturbing reactions which are autocatalyzed by too high an acid degree. The reliability in operation is decisively increased by preventing the hydrogen ion concentration from reaching too rapidly the critical limit for initiating interfering reaction, which usually is at about pH 5.0.

I have also found that an empirical measure for the sulfite concentration in the first reduction step, which must not fall below a definite level, can be found by taking at that step a small portion, heating it within a few seconds to a constant temperature of above 50° C., preferably 80–85° C., and determining then the pH value in this mixture in the usual manner. By this sudden heating the desired reaction proceeds so rapidly and to such an extent that the pH-buffering action of the sodium sulfite which, in the first reduction step, renders the measuring of the pH unserviceable as a criterion, practically disappears. There are also avoided inaccuracies of the measurement which would occur in the first reduction step by crystal coverings on the measuring electrodes. The amount of sodium hydroxide solution introduced in the first reduction step is adjusted so that the measuring value obtained in the aforementioned manner remains constant. I have found that a sufficient amount of sodium sulfite is available for the reduction of the phenyldiazonium chloride if the pH value is kept between 5.2 and 7.0, preferably at 5.8 to 6.1.

Finally, I have found that the residual amount of bisulfite required for the complete reaction of the diazotized aniline can be adjusted, irrespective of incidental variations of the concentration of the bisulfite solution used for the production and of variations of the quantities added to the first reduction step, in a manner such that the reduction mixture heated to 80 to 85° C. is brought to a pH of 5.0 to 6.5, preferably 5.5 to 5.7, by the addition of bisulfite.

The working method described above can be carried out in a fully automatic manner and brings about savings of labor, zinc dust, acetic acid and filtering devices, thus reducing the price of the final product.

The following example serves to illustrate the invention but it is not intended to limit it thereto.

*Example*

The process is illustrated on the basis of the accompanying drawing given by way of example.

Sodium bisulfite solution and sodium hydroxide solution are fed from storage tanks 1 and 2 by dosing pumps 3 and 4 into a cycle consisting of an open funnel 5 with connected cooling coil 6, pump 7 and a tube system. A hydrochloric acid solution of diazotized aniline, which is advantageously prepared in a continuous manner, flows likewise in a constant stream through line 9 into funnel 5 in which a temperature measuring device 8 is installed. The reaction mixture leaves the cycle through line 10 in the form of a light yellow paste. A small partial stream is taken from the reaction mixture, heated to a constant temperature of above 50° C. in heating pipe 11, and then conveyed through measuring line 12 in which a temperature measuring device and pH measuring electrodes are installed. The influx of sodium hydroxide solution is adjusted according to the pH reading in that place.

The partial steam used for measuring and the main product of the first reduction step conveyed through line 10 flow into heater 13 which is a stirring vessel provided with heating jacket. The temperature measured by thermometer 14 is maintained at 80–85° C. In heater 13 is installed a further pH measuring device 15. According to its reading, the amount of bisulfite solution required for the remaining reduction is fed from storage tank 1 via dosing pump 16 and line 17 into heater 13. The reaction mixture flows then through line 18 into ripening vessel 19 provided with baffles 20 and protected against loss of heat by a hot water jacket. The reaction mixture leaves the ripening vessel 19 through line 21 as a light yellow solution and is introduced from the bottom into precipitating vessel 22 provided with stirrers into which at the same time concentrated hydrochloric acid is fed from storage tank 23 via dosing pump 24. A paste of phenylhydrazine hydrochloride is formed which rises in the stirring vessel and leaves it through overflow 25. The phenylthydrazine hydrochloride can be obtained from this paste in the usual manner.

Into the cycle of the appartus described above the following amounts are introduced per hour:

208 kilograms of an aqueous sodium bisulfite solution (40% strength)
38.5 kilograms of sodium hydroxide solution (45% strength)
206.8 kilograms of a diazo solution prepared from
    40.1 kilograms of aniline
    40 liters of water
    104.0 kilograms of hydrochloric acid (about 30% strength)
    76.7 kilograms of sodium nitrite solution (40% strength)

The temperature is maintained at 30° C. by cooling, and the measuring device 12 shows a pH of 5.9 to 6.1.

37 kilograms per hour of sodium bisulfite solution are additionally introduced into heater 13, the pH value thus varying there between 5.5 and 5.7.

At the same time 93 kilograms of hydrochloric acid of 30% strength are fed into the precipitating vessel.

When the phenylhydrazine hydrochloride obtained is worked up in the usual manner by cooling and centrifuging, and by setting free, extracting and distilling the phenylhydrazine base, the same yields are obtained as by the known reduction with aftertreatment by means of acetic acid and zinc dust.

I claim:

1. A process for preparing phenylhydrazine hydrochloride which comprises A) rapidly and intimately mixing, at a temperature within the range of 0 to 30° C., phenyldiazonium chloride with an amount of a mixture of sodium sufite and sodium bisulfite sufficient to give the resulting reduction mixture, when heated to 80 to 85° C., a pH of 5.0 to 7.0, B) heating said reduction mixture to a temperature within the range of 80 to 85° C. to reduce the phenyldiazonium chloride to phenylhydrazine hydrochloride, C) adding concentrate hydrochloric acid thereto to precipitate the phenylhydrazine hydrochloride so formed, and D) isolating the precipitated phenylhydrazine hydrochloride from the reaction mixture.

2. A process as claimed in claim 1 wherein the heated reduction mixture is maintained for 15 to 120 minutes at a temperature ranging between 80 and 85° C.

3. A process as claimed in claim 1, wherein the reaction is carried out in a continuous manner.

4. A process as claimed in claim 1, wherein the mixture of sodium sulfite and sodium bisulfite required for the reduction is prepared from sodium bisulfite and sodium hydroxide solution in the presence of the phenyldiazonium chloride.

5. A process as claimed in claim 4, wherein the amount of sodium hydroxide solution added is adjusted in a manner such that the reaction mixture has a pH-value of 5.2 to 7.0 when rapidly heated to at least 50 to 85° C.

6. A process as claimed in claim 1, wherein only about 75 to 95% of the total amount of the sulfite/bisulfite mixture required for the reduction are mixed with the phenyldiazonium chloride at 0 to 30° C. and the remaining amount is added by the reduction mixture during the subsequent course of the process.

7. A process as claimed in claim 6, wherein the remaining amout of the sulfite/bisulfite mixture is added at a rate such that the reduction mixture immediately after heating has a pH-value of 5.0 to 6.0.

References Cited by the Examiner

UNITED STATES PATENTS 2,013,394   9/35   Tolstoouhov           260—575

FOREIGN PATENTS 758,395   10/56   Great Britain.

OTHER REFERENCES

Suckfull et al.: German printed application, 1,075,627, printed Feb. 18, 1960.

CHARLES B. PARKER, *Primary Examiner.*